US012585879B2

(12) United States Patent
Coudert et al.

(10) Patent No.: US 12,585,879 B2
(45) Date of Patent: Mar. 24, 2026

(54) ARTIFICIAL INTELLIGENCE ASSISTED NETWORK OPERATIONS REPORTING AND MANAGEMENT

(71) Applicant: T-MOBILE INNOVATIONS LLC, Overland Park, KS (US)

(72) Inventors: Oliver Coudert, Arlington, VA (US); Bharatwajan Raman, Arlington, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 265 days.

(21) Appl. No.: 18/338,075

(22) Filed: Jun. 20, 2023

(65) Prior Publication Data

US 2024/0430173 A1      Dec. 26, 2024

(51) Int. Cl.
| | |
|---|---|
| *G06F 40/30* | (2020.01) |
| *G06F 40/40* | (2020.01) |
| *H04L 41/16* | (2022.01) |
| *H04L 41/22* | (2022.01) |
| *H04W 16/18* | (2009.01) |

(52) U.S. Cl.
CPC .............. *G06F 40/30* (2020.01); *G06F 40/40* (2020.01); *H04L 41/16* (2013.01); *H04L 41/22* (2013.01); *H04W 16/18* (2013.01)

(58) Field of Classification Search
None
See application file for complete search history.

(56) References Cited

U.S. PATENT DOCUMENTS

| | | | |
|---|---|---|---|
| 11,196,687 B1 * | 12/2021 | Mall ........................ | G06F 40/20 |
| 11,765,207 B1 * | 9/2023 | McCarthy ............. | G06F 40/186 |
| 12,141,536 B1 * | 11/2024 | Khosla ................... | G06F 40/126 |
| 2019/0188326 A1 * | 6/2019 | Daianu ............. | G06F 16/90332 |
| 2021/0157985 A1 * | 5/2021 | Rotkop ................. | G06F 40/205 |
| 2022/0101052 A1 * | 3/2022 | Canim .................... | G06F 17/18 |

(Continued)

OTHER PUBLICATIONS

Holm, Henrik. "Bidirectional encoder representations from transformers (bert) for question answering in the telecom domain.: Adapting a bert-like language model to the telecom domain using the electra pre-training approach." (2021). (Year: 2021).*

(Continued)

*Primary Examiner* — Douglas Godbold

(57) ABSTRACT

Systems, methods, and devices are disclosed herein for an application service that utilizes a large language model (LLM) to assist with performing management tasks associated with a wireless communications network. In an implementation, the application service receives natural language input indicative of a management task to complete with respect to the network. The application service identifies a context of the management task, which helps constrain the LLM to the appropriate domain(s). The application service generates a prompt that incorporates the task and the context and submits the prompt to the LLM. The application service receives from the LLM a reply that includes a plan that details a series of steps and associated resources of the domain for completing the management task. Upon receiving the LLM's reply, the application service performs the management task based on the provided plan.

20 Claims, 8 Drawing Sheets

(56)        References Cited

U.S. PATENT DOCUMENTS

| | | | |
|---|---|---|---|
| 2022/0385728 A1* | 12/2022 | Negle | H04L 41/5054 |
| 2023/0154221 A1* | 5/2023 | Gu | G06F 18/253 |
| | | | 382/156 |
| 2024/0070394 A1* | 2/2024 | Peng | G06F 40/40 |
| 2024/0143927 A1* | 5/2024 | Yoon | G06N 3/08 |
| 2024/0176958 A1* | 5/2024 | Raimondo | G06N 3/0455 |
| 2024/0185001 A1* | 6/2024 | Nagaraju | G06F 40/284 |
| 2024/0256906 A1* | 8/2024 | Yadav | G06N 5/02 |
| 2024/0281472 A1* | 8/2024 | LaRhette | G06F 16/248 |
| 2024/0370517 A1* | 11/2024 | DeVos | G06F 40/30 |
| 2024/0378391 A1* | 11/2024 | Bradley | G06F 40/35 |
| 2024/0394479 A1* | 11/2024 | Pathak | G06F 40/295 |
| 2024/0411752 A1* | 12/2024 | Prabhakar | H04L 41/0895 |
| 2024/0419912 A1* | 12/2024 | Somech | G06F 40/279 |
| 2024/0430173 A1* | 12/2024 | Coudert | H04W 16/18 |

OTHER PUBLICATIONS

Lewis, Patrick, et al. "Retrieval-augmented generation for knowledge-intensive nlp tasks." Advances in neural information processing systems 33 (2020): 9459-9474. (Year: 2020).*

* cited by examiner

RECEIVE A NATURAL LANGUAGE INPUT INDICATIVE OF A MANAGEMENT TASK
201

IDENTIFY A CONTEXT OF THE MANAGEMENT TASK
203

GENERATE A PROMPT THAT IDENTIFIES THE MANAGEMENT TASK AND THE CONTEXT
205

SUBMIT THE PROMPT TO THE LLM TO ELICIT A REPLY INDICATING A PLAN FOR COMPLETING THE MANAGEMENT TASK
207

RECEIVE THE REPLY FROM THE LLM THAT INCLUDES THE PLAN
209

PERFORM THE MANAGEMENT TASK
209

200

800

COMPUTING SYSTEM 801

STORAGE SYSTEM 803

SOFTWARE 805

REPORTING PROCESS 806

COMM. I/F SYS. 807

PROCESSING SYSTEM 802

USER I/F SYS. 809

ARTIFICIAL INTELLIGENCE ASSISTED NETWORK OPERATIONS REPORTING AND MANAGEMENT

TECHNICAL FIELD

Aspects of the disclosure are related to the field of computing hardware and software, particularly to artificial intelligence assisted data analysis and reporting for telecommunications systems.

TECHNICAL BACKGROUND

Operational data of a wireless communications network can be vast in quantity and stored across disparate domains of the network. Accessing this data is important in order for network managers to make informed decisions about network operations. A network manager may employ various software tools and technologies to collect, clean, and transform operational data into visualizations and reports that could be relied upon to troubleshoot issues, optimize system performance, assess sales or other metrics, etc. However, with such vast quantities of data, it may be difficult to know where or how to access the data. Additionally, understanding which chart types to use and how to best visualize the operations data can be time-consuming and requires significant expertise in both data analysis and graphic design.

While machine learning algorithms may be used in wireless communications networks to facilitate spectrum management, signal processes, and resource allocation, not much progress has been made in the design and implementation of accurate and reliable machine learning models that facilitate execution of network management tasks (e.g., report generation, data visualization, control of operating parameters of network assets, etc.). Additionally, existing software solutions may not be able to keep up with the scale and complexity of data sets stored with regard to a domain of the wireless communications network.

It is with respect to this general technical environment that aspects of the present technology disclosed herein have been contemplated. Furthermore, although a general environment has been discussed, it should be understood that the examples described herein should not be limited to the general environment identified in the background.

Technical Overview

Technology is disclosed herein for an application that interfaces with a large language model (LLM) service to assist with wireless communications network management and reporting processes. In an implementation, an application receives a natural language input indicative of a management task to complete with respect to a wireless communications network. The application identifies a context of the management task that will constrain a LLM to a domain of the wireless communications network. The application generates a prompt that identifies the management task and the context and submits the prompt to the LLM to elicit a reply indicating a plan for completing the management task that includes a list of steps and associated resources of the domain. The application receives the reply from the LLM, including the plan and performs the management task based on the plan.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
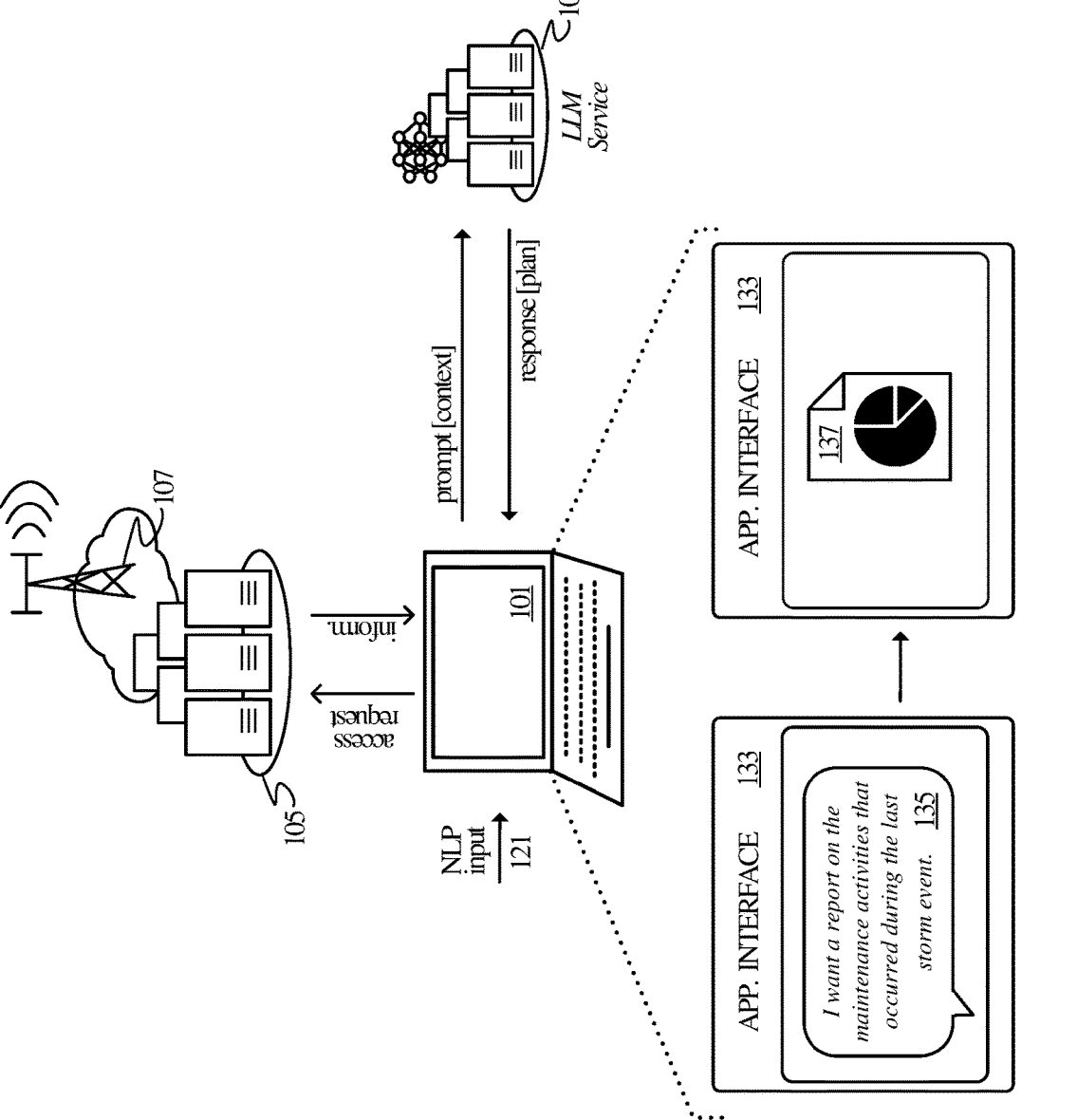
FIG. 1 illustrates an operational environment in an implementation.

Technology disclosed herein is generally directed to improving network operations management and reporting. Various implementations employ a reporting process that facilitates a computer-implemented system to integrate large language models (LLMs) with the management and reporting operations associated with a wireless communications network. LLMs provide a more flexible and data-driven approach to language processing that includes the LLM learning patterns and associations of natural language input based on large datasets of human text to generate responses to the input that is contextually appropriate and linguistically rich. By leveraging the capabilities of an LLM, technology disclosed herein facilitates execution of network management tasks while keeping up with the scale and complexity of the data stored in association with the wireless communications network.

In an implementation, a user associated with the network (e.g., vice president, a sales representative, an operations manager, etc.) submits a natural language query to a management application implemented in software on a computing device. The natural language query indicates a management task to complete with respect to the wireless communications network. Example management tasks include report generation, systems health assessment, operations data visualization, asset management, control of asset operating parameters, etc.

The management application identifies a context of the management task based on keywords and/or phrases of the input. For example, if the user asks for a report on the maintenance activities in Texas that occurred during the last three hurricane seasons, the management application may identify "maintenance activities" as context of a domain of the communications network, such as a network maintenance domain, etc. The management application may identify "report" as context of a sub-domain of the network maintenance domain, such as a report templates domain hosted within the network maintenance domain. Alternatively, the management application may identify "report" as its own domain of the network.

The management application then generates a prompt for submittal to an LLM. The prompt identifies a management task (e.g., report generation) and a context (e.g., maintenance statistics, report, hurricane season, Texas, etc.) based on the natural language input. The context constrains the LLM to a domain of the wireless communications network (e.g., network maintenance domain, a network infrastructure domain, a network operations domain, data services domain, voice services domain, sales domain, administrative domain, etc.).

The management application submits the prompt to the LLM to elicit a reply that includes a plan for completing the management task. The management application then receives the reply from the LLM that includes the plan, which may include a list of steps for completing the management task and associated resources of the domain. For example, the plan may indicate a step to identify a date range of the last three hurricane seasons, the data for which may be obtained from a resource of the maintenance domain. Another step of the plan may be to extract maintenance records from a resource of the maintenance domain, and to access a report template associated with reporting on the maintenance activities. A last step may be to generate a report based on the maintenance records and the report template. The management application then performs the management task based on the plan, for example, by executing the steps listed in the plan, etc.

In the same or other embodiment, the management task includes generating a visualization of data (e.g., generating a graph or other image descriptive of the data, etc.). Visualizing data can be a challenging task as it often requires not only expertise in data analysis but also graphic design skills. While there are several visualization tools available to assist with creating graphics, identifying the most appropriate chart types to use and visualizing complex data can still be challenging for those without prior experience.

The enhanced management and reporting techniques disclosed herein improve the performance of network management tasks while keeping up with the scale and complexity of the data stored in association with the wireless communications network. Various technical effects achieved by the implementations disclosed herein may be obvious and include improvements to the demand on computing resources, improvements to computer-generated reporting activities (e.g., by increasing access of computing systems to network data, which may be located across one or more domains of the wireless network; by increasing content generation activities of computing systems, etc.), and improved management activities at least by leveraging the reporting activities to automatically adjust the operations of network assets (e.g., changing the direction of a radio frequency transmitter and/or receiver, changing the operational status of an asset, etc.).

Turning to the Figures, FIG. 1 illustrates an operational environment 100 in an implementation. Operational environment 100 includes computing device 101, service 103, and domain 105 of a wireless communications network.

Figure 8:
FIG. 8 illustrates a computing system suitable for implementing the various operational environments, architectures, processes, scenarios, and sequences discussed below with respect to the other Figures.
Figure 8:
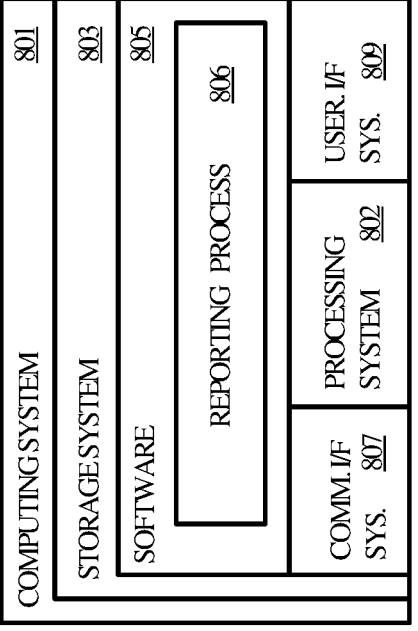

Computing device 101 includes one or more software applications capable of employing a reporting process to perform the steps of a management task. Computing device 101 may also be capable of driving a user experience including by displaying a user interface to the application (e.g., interface 133, etc.), receiving a user input (e.g., NLP 121, NLP 135, etc.) via the user interface, and responding to the user input per the management and reporting process (e.g., report 137, etc.). Examples of computing device 101 include personal computers, tablet computers, mobile phones, and any other suitable devices, of which computing device 801 in FIG. 8 is broadly representative. Example applications include project management applications, task management applications, productivity applications, as well as any other application having such management and reporting capabilities integrated therein. The application may be a natively installed and executed application, a browser-based application, or a mobile application, and may execute in a stand-alone manner, within the context of another application, or in some other manner entirely. Computing device 101 may communicate with service 103 and/or domain 105 via one or more internets and intranets, the Internet, wired and wireless networks, local area networks (LANs), wide area networks (WANs), and any other type of network or combination thereof. It may be appreciated that some of the features and functionality attributed to the application on computing device 101 may be performed by domain 105 in some implementations.

Service 103 is representative of a large language model (LLM) trained to process a natural language input and generate a coherent and contextually appropriate response to the input (e.g., a natural language response, computer code, etc.). Examples of service 103 include a Generative Pre-trained Transformer (GPT) model, a Bidirectional Encoder Representations from Transformer (BERT) model, and the like. Service 103 may be trained to identify patterns and associations based on a dataset that includes natural language content (e.g., domain 105). Though service 103 is depicted as being separate from domain 105, it is contemplated herein that service 103 may be hosted on the premises of domain 105 or hosted on a server remote to domain 105.

Domain 105 is representative of one or more domains hosted by a wireless communications network of an Internet Service Provider (ISP) (e.g., T-Mobile®). Example domains include a sales domain, a network infrastructure domain, a network operations domain, data services domain, voice services domain, and the like. Domain 105 is associated with domain-specific features. Example domain-specific features for a sales domain include data and assets associated with the tasks, activities, and content related to the sale of consumer goods and services, such as sales reports, marketplace information, platform information, supply chain information, etc. Example domain-specific features for a network infrastructure domain includes data and assets associated with the tasks, activities, and content related to the infrastructure of a wireless communications network, such as maintenance policies and procedures, system monitoring and performance data, helpdesk inquiries and resolutions, systems configuration, etc. Example domain-specific features for a network operations domain includes data and assets associated with the tasks, activities, and content related to the operations of a wireless communications network, such as legal policies and procedures, human resource policies and procedures, marketing policies and procedures, etc. Example domain-specific features for a data services domain includes data and assets associated with the tasks, activities, and content related to the operations of a wireless communications network. Example domain-specific features for a voice services domain includes data and assets associated with the tasks, activities, and content related to the operations of a wireless communications network, such as data collection and integration, data processing and analysis, data visualization and reporting, etc.

Domain 105 includes networking technology 107, which is representative of telecommunications networking technologies (e.g., antenna towers, transmission towers, switches, edge servers, etc.) distributed over long distances and between different networks. Domain 105 further includes a radio access network that connects individual devices (e.g., cellular phones, tablets, gateway devices, etc.) to the core ISP network and provides radio coverage to multiple devices of a geographic area. Domain 105 may include Fifth Generation New Radio (5G NR) network technology, which leverages technologies like millimeter-wave spectrum, massive MIMO, and network slicing to meet the demands of diverse use cases. Domain 105 employs one or more server computers co-located or distributed across one or more data centers connected to or otherwise in communication with computing device 101 and/or networking technology 107. Examples of such servers include web servers, application servers, virtual or physical (bare metal) servers, or any combination or variation thereof, of which computing device 801 in FIG. 8 is broadly representative. Domain 105 may communicate with computing device 101 and/or networking technology 107 via one or more internets and intranets, the Internet, wired and wireless networks, local area networks (LANs), wide area networks (WANs), and any other type of network or combination thereof.

Figure 2:
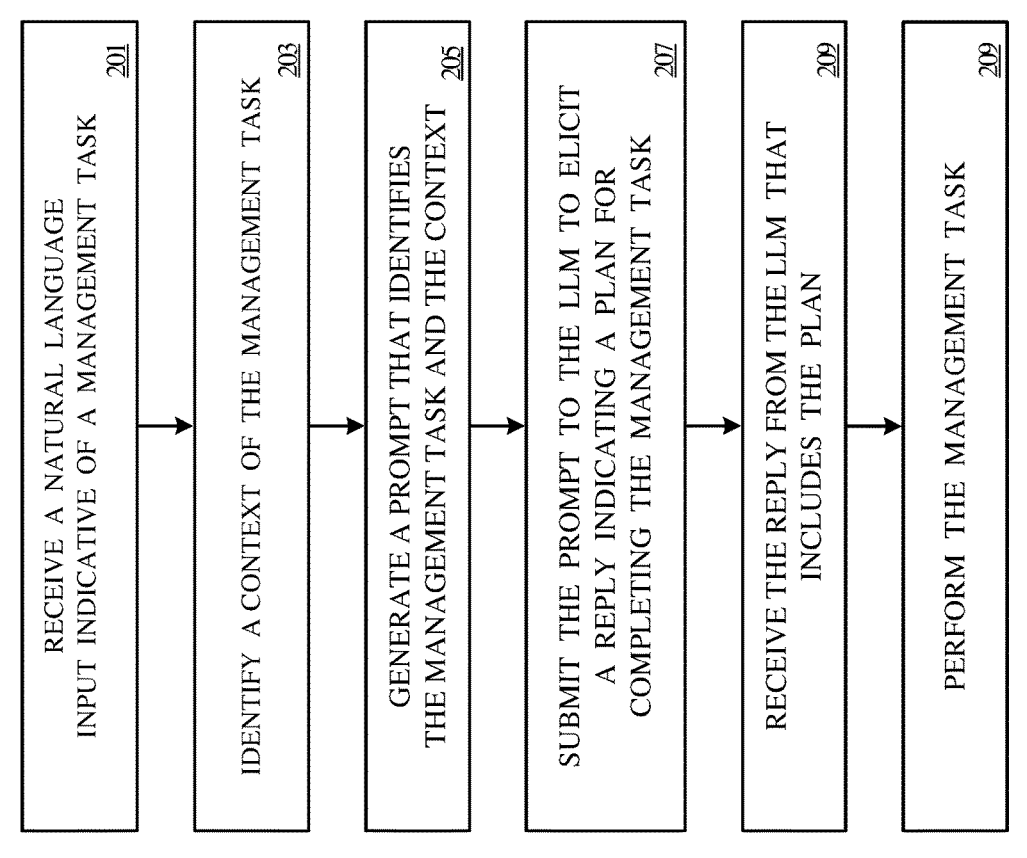
FIG. 2 illustrates an exemplary reporting process in an implementation.
Figure 3:
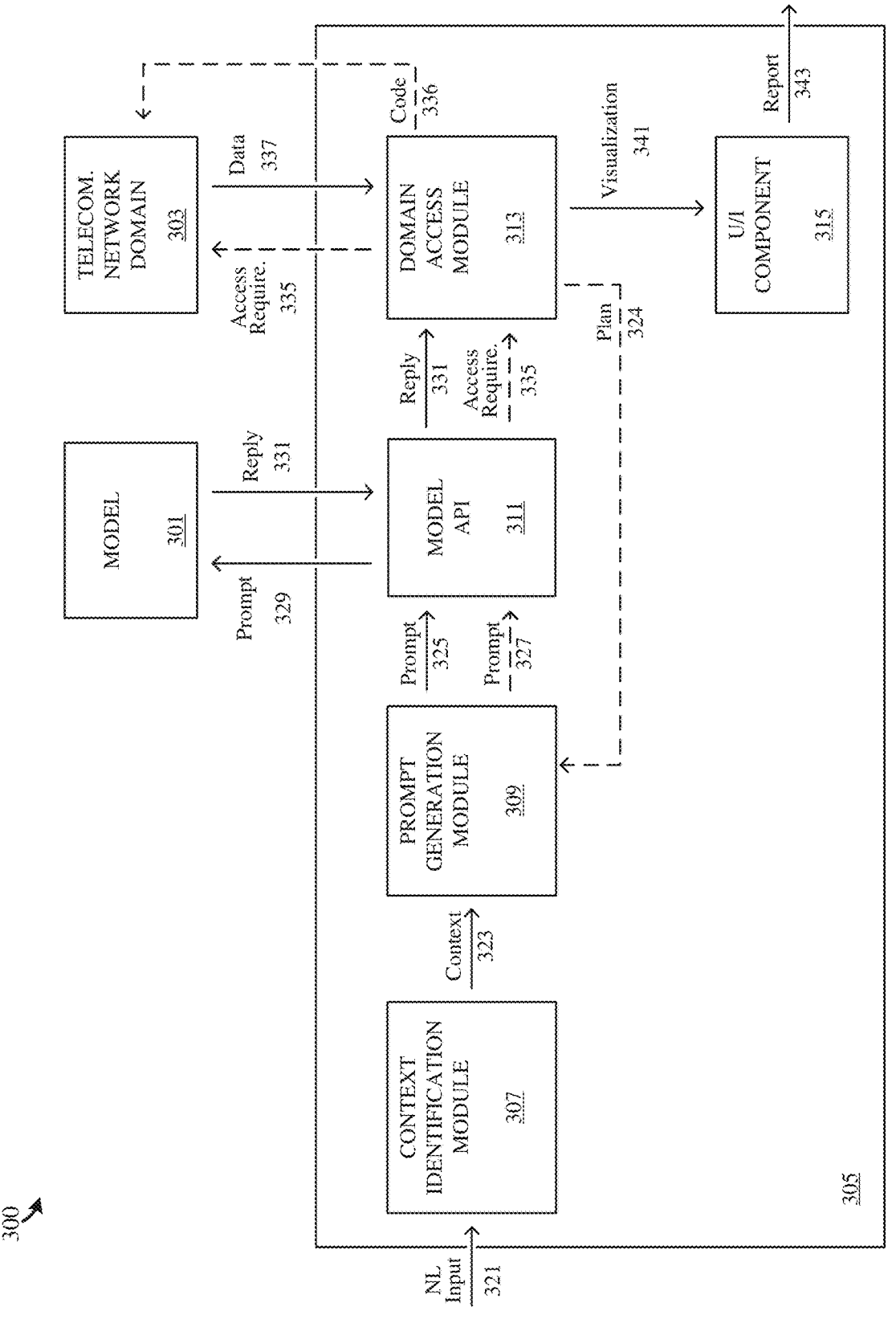
FIG. 3 illustrates a conceptual schematic environment in accordance with an implementation.

FIG. 2 illustrates reporting process 200, and FIG. 3 illustrates operational architecture 300 in an implementation of a management application providing the improved network operations management and reporting processes disclosed herein. Reporting process 200 may be implemented in program instructions in the context of any of the software applications, modules, components, or other such elements of one or more computing devices (e.g., computing device 101, domain 105, etc.) disclosed herein. The program instructions, when executed by one or more processors of the computing device(s), direct the computing device(s) to operate as follows. The steps of reporting process 200 are discussed parenthetically in the context of the discussion of FIG. 3.

Operational architecture 300 includes model 301, domain 303, and reporting process logic 305, of which software 805 of FIG. 8 may be representative. Model 301 is representative of an LLM capable of processing natural language requests to generate a desired output (e.g., a natural language response, computer code, etc.). Examples of model 301 include a Generative Pretrained Transformer (GPT) model, a Bidirectional Encoder Representations from Transformer (BERT) model, and the like. Model 301 may be trained (e.g., via computing device 101 of FIG. 1, reporting process logic 305, etc.) on a corpus of data that includes content of a database and/or domain 303. The content includes operational documents (e.g., sales reports, weather reports, telemetric data, asset operations, etc.), operations manuals, report templates, etc. Model 301 may be dynamically updated (e.g., via computing device 101 of FIG. 1, reporting process logic 301, etc.) by collecting and reviewing analytics from domain 303, etc. Though model 301 is depicted as being separate from domain 303, it is contemplated herein that model 301 may be hosted on a server of domain 303.

Domain 303 is representative of one or more domains hosted by a wireless communications network of an ISP, such as domain 105 of FIG. 1. Domain 303 is associated with domain-specific features (e.g., data and assets associated with the tasks, activities, and content related to the domain, etc.). Domain 303 may include telecommunication networking technologies (e.g., antenna towers, transmission towers, switches, edge servers, etc.) distributed over long distances and between different networks. Domain 303 may further include radio access networks that connect individual devices (e.g., cellular phones, tablets, gateway devices, etc.) to the core ISP network and provides radio coverage to multiple devices of a geographic area. Domain 303 may include Fifth Generation New Radio (5G NR) network technology, which leverages technologies like millimeter-wave spectrum, massive MIMO, and network slicing to meet the demands of diverse use cases. Domain 303 employs one or more server computers co-located or distributed across one or more data centers. Examples of such servers include web servers, application servers, virtual or physical (bare metal) servers, or any combination or variation thereof, of which computing device 801 in FIG. 8 is broadly representative.

Reporting process logic 305 is implemented in program instructions that comprise various software modules, components, and other elements of the application such as context identification module 307, prompt generation module 309, model API 311, domain access module 313, and component 315. Reporting process logic 305 may be a locally installed and executed application, a desktop application, a mobile application, a streamed (or streaming) application, a web-based application that is executed in the context of a web-browser, or any other type of application capable of employing process 200 of FIG. 2. Though the functionality of reporting process logic 305 is described as occurring within specific modules, it is contemplated herein that the disclosed functionality may be implemented by one or more of the software modules, components, and/or other elements of reporting process logic 305 without departing from the scope of the disclosure.

Context identification module 307 is representative of a module that employs natural language processing and machine learning algorithms to extract relevant information from a natural language input, such as temporal information (e.g., reference to a specific data/time, reference to a date/time range, etc.), location information, (e.g., asset location, event location, etc.), etc. Context identification module 307 also employs natural language processing and machine learning algorithms to derive an intention and/or purpose of the input (e.g., sales inquiry, maintenance inquiry, domain specific inquiry, etc.) and to derive the context of the input, such as a domain context (e.g., information about the domains of a network; template of a domain that maps relationships between the content of the domain with the assets of the domain; hierarchical structure of systems, data, assets, etc. of a domain; etc.) etc. Context identification module 307 may derive the intention, purpose, and/or context of the input by tokenizing the input into individual tokens and analyzing aspects of the tokens to identify named entities (e.g., people, places, assets, etc.), identify grammatical relationships between words, and/or semantic structures. Context identification module 307 may also use topic modeling techniques, such as Latent Dirichlet Allocation, to derive the context of the input. Context identification module 307 is configured to receive natural language input 321, to generate context 323, and to transmit context 323 to prompt generation module 309.

Prompt generation module 309 is representative of a prompt generation engine that employs natural language processing and machine learning algorithms to generate natural language prompts for submission to LLMs (e.g., model 301). Prompt generation module 309 includes a natural language model and a prompt generator. The prompt generator creates prompts based on fine-tuned models that were trained on task-specific data (e.g., acceptable questions and corresponding answers, speaking with a specific voice, categorization, context of user inputs, report generation, visualization of data, etc.) to learn patterns in language used in managing and reporting on the operations of communications networks. Prompt generation module 309 uses the natural language model and prompt generator to generate natural language prompts in response to user inputs (e.g., input 321). Prompt generation module 309 may use a variety of techniques, including rule-based systems, machine learning algorithms, and deep learning models, to generate accurate and effective prompts. Prompt generation module 309 is further configured to receive context 323 (e.g., from context identification module 307), to receive plan 324 (e.g., from domain access module 313), to generate prompts 325 and 327, and to transmit prompts 325 and 327 (e.g., to model API 311).

Model API 311 is representative of an application programming interface (API) to a large language model. Specifically, model API 311 includes a set of programming instructions and standards for accessing and interacting with an LLM (e.g., model 301). Model API 311 is configured to receive prompts 325 and 327 (e.g., from prompt generation module 309), to transmit prompt 329 (e.g., to model 301), to receive reply 331 (e.g., from the model 301), and to transmit plan 333 and access requirements 335 (e.g., to domain access module 313).

Domain access module 313 is representative of an access module that enables the authorized retrieval of data from a domain of a wireless communications network while maintaining the security of the domain. Domain access module 313 may access the domain by establishing a secure connection to the target domain (e.g., domain 303, etc.), which may be achieved through protocols like hypertext transfer protocol secure (HTTPS), virtual private network (VPN), secure shell (SSH), etc. Domain access module 313 may use an access requirement (e.g., access requirement 335) to verify permissions for accessing the domain. The access requirement may include an algorithm for accessing an asset of domain 303 (e.g., a database, a computing device, equipment, etc.).

Subsequent to accessing the domain, domain access module 313 may make an API call, execute a database query, and/or interact with specific network protocols to retrieve data from the domain. Domain access module 313 may perform data transformation or preprocessing tasks to ensure the retrieved data is in a suitable format. This may involve converting the data into a specific schema, applying filters or aggregations, handling data encryption and/or decryption, etc. Data transformation, processing, conversion, etc. may be performed by domain access module 313 as part of performing a management task. Domain access module 313 is further configured to receive reply 331 and access requirements 335 (e.g., from model API 311), to generate plan 324 and transmit plan 324 (e.g., to prompt generation module 309), to generate code 336 and transmit code 336 (e.g., to domain 303), to transmit access requirements 335 (e.g., to domain 303), to receive data 337 (e.g., from domain 303), and to generate visualization 341 and transmit visualization 341 (e.g., to component 315).

Component 315 is representative of a user interface component that enables display of visualizations of network operations. Component 315 may incorporate a set of graphical user interface (GUI) controls in the graphical user interfaces such as buttons, menus, text boxes, and other interactive elements that allow users to interact with reporting process logic 305. Component 315 may interact with other components of reporting process logic 305, such as the business logic layer, the data access layer, and the communication layer. For example, when a user submits a natural language input, component 315 may receive the natural language input and communicate with the business logic layer to transmit the input to context identification module 307. Component 315 is further configured to receive visualization 341 (e.g., from domain access module), generate report 343, and enable display of report 343 in the user interface of a computing device (e.g., interface 133 of FIG. 1).

In an embodiment, context identification module 307 receives natural language input 321, which is indicative of a management task (e.g., a report associated with domain 303) (step 201). Natural language input 321 may be a verbal communication, a written communication, a gesture, etc. For example, natural language input 321 may include a request to "report on the sale of a consumer good seven days before, the day of, and seven days after each of the last five Super Bowls," etc. Responsive to receiving natural language input 321, context identification module 307 identifies the context of the management task indicated by natural language input 321 (step 203). Context identification module 307 may extract information from the natural language input (e.g., temporal information, location information, etc.) to identify the context as well as to derive the intention and/or purpose of the input. Context identification module 307 generates context 323 based on the identified context of the management task and transmits context 323 to prompt generation module 309. Context 323 may include information extracted from the natural language input and may further include the intention and/or purpose of the input. Context 323 may include domain-specific features of one or more domains (e.g., of domain 303).

Responsive to receiving context 323, prompt generation module 309 generates prompt 325, which identifies the management task and the context of the management task (step 205). Prompt 325 includes a natural language query requesting a plan for completing the management task. Prompt generation module 309 then transmits prompt 325 to model API 311. Model API 311 submits prompt 325 (e.g., as prompt 329) to model 301 (step 207) and receives a reply (e.g., reply 331) from model 301 (step 209). The reply includes a plan for completing the management task that includes a list of steps and associated resources of one or more domains (e.g., domain 303). The reply may also include access requirements for accessing the one or more domains (e.g., domain 303). The access requirement may be used to extract information related to the plan or the management task and/or to change an operating parameter of an asset of domain 303. The reply may also include an algorithm for controlling the operating parameters of one or more assets of domain 303. Model API 311 then transmits the reply to domain access module 313.

Responsive to receiving the reply, domain access module 313 performs the management task based on the plan (step 209). Domain access module 313 may perform the management task by accessing a database associated with domain 303 and extracting from the database information related to the management task. Domain access module 313 may perform the management task by generating visualization 341 based on the plan and/or the extracted information. Visualization 341 may include a report, one or more of a graph, a chart, a word document, a slide presentation, an animation, or a combination thereof.

Domain access module 313 may perform the management task by controlling, based on the plan and/or the extracted information, an operating parameter of an asset of the wireless communications network. Example operating parameters include positioning of an asset, power supply to an asset, network management, etc. Examples of controlling operating parameters of assets include changing the position of an asset (e.g., repositioning a transmit antenna, repositioning a receive antenna, etc.), changing the power supply to an asset (e.g., powering down an element of a RAN, powering up an element of a RAN, etc.), etc. Domain access module 313 may control an operating parament of a network asset by transmitting code 336 to an asset of domain 303. Code 336 may be generated based on an algorithm indicated by the reply from model 301 (e.g., reply 331).

If domain access module 313 determines access requirements are needed to perform the management task and the reply does not include the access requirements, then domain module 313 may extract the plan from the reply and transmit the plan (e.g., as plan 324) to prompt generation module 309. Responsive to receiving the plan, prompt generation module 309 generates prompt 327, which identifies the plan and a template of domain 303. The template of domain 303 may be stored in association with prompt generation module 309, may be stored in association with domain access module and provided to prompt generation module 309 with plan 324, and the like. Prompt 325 includes a natural language query requesting access requirements for extracting, from a datastore of domain 303, information related to the management task and/or plan 324. Prompt generation module 309 then transmits prompt 327 to model API 311.

Model API 311 submits prompt 327 (e.g., as prompt 329) to model 301 to elicit a reply to prompt 327. Model API 311 receives the elicited reply (e.g., reply 331) from model 301, which includes the access requirements for extracting the information related to the management task and/or plan 324. Model API 311 then transmits the reply to domain access module 313. Domain access module 313 then proceeds with performing the management task, which includes accessing a database of domain 303 using the access requirements.

Component 315 receives visualization 341 from domain access module 313 and generates a graphical user interface (e.g., report 343) based on visualization 341. Component 315 enables display of report 343 in a user interface of a computing device.

Figure 4:
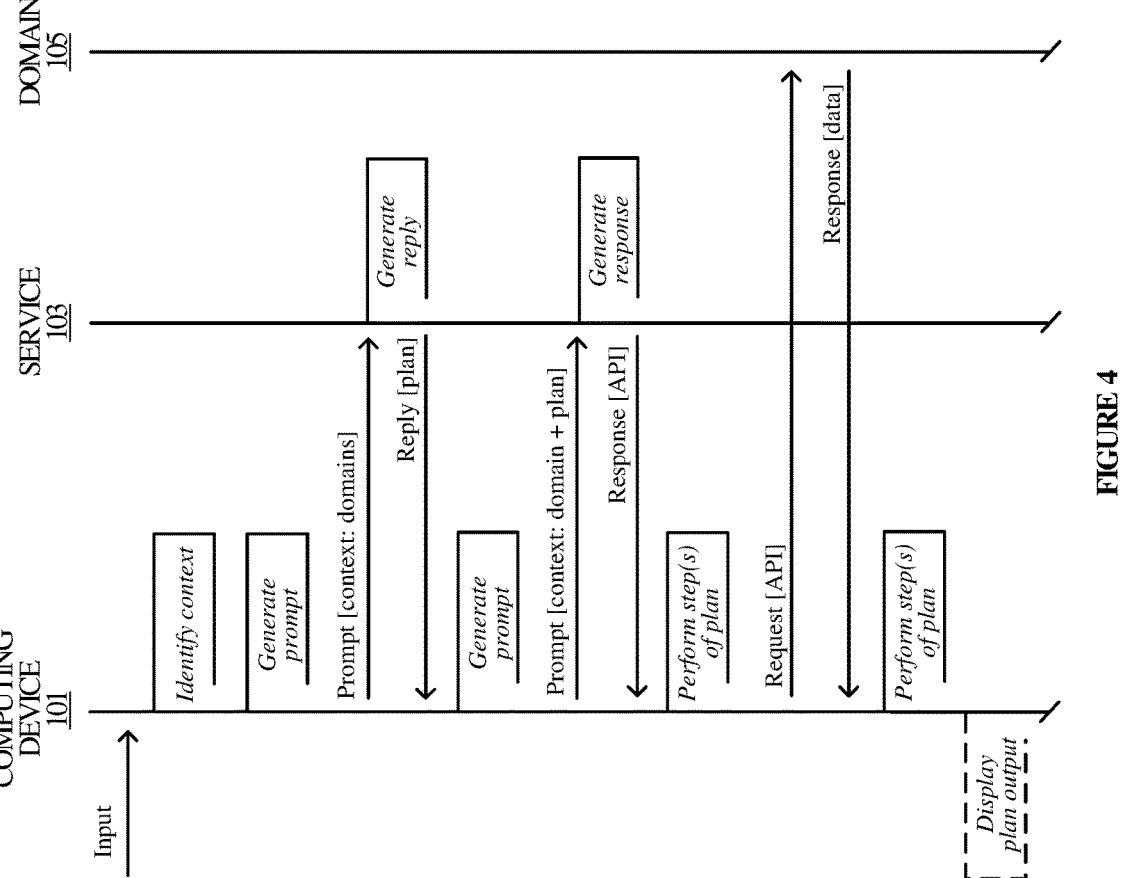
FIG. 4 illustrates an operational scenario in an implementation.
Figure 4:

FIG. 4 illustrates operational scenario 400 in an implementation and refers to elements of FIG. 1. In operational scenario 400, computing device 101 (e.g., via reporting process 200 of FIG. 2, via reporting process logic 305 of FIG. 3, etc.) receives a natural language input indicative of a management task to complete with respect to a wireless communications network. Computing device 101 identifies a context of the management task that will constrain service 103 to a domain of the wireless communications network (e.g., a network infrastructure domain, a network operations domain, a data services domain, a voice services domain, and a sales domain). For example, the context may constrain service 103 to a network infrastructure domain exclusive of the network operations domain, the data services domain, the voice services domain, and the sales domain; the context may constrain service 103 to a data services domain exclusive of network infrastructure domain, the network operations domain, the voice services domain, and the sales domain; etc.

Next, computing device 101 generates a prompt that identifies the management task and the context. In the present embodiment, the context includes a domain context for the wireless communications network. The domain context includes information about two or more domains of the wireless communications network. The domain context may also include a template of the domains that maps the relationships between content of the domains. Computing device 101 then submits the prompt to service 103 to elicit a reply indicating a plan for completing the management task that includes a list of steps and associated resources of the domain.

Service 103 generates a reply in response to the prompt and transmits the reply to computing device 101. The reply indicates the plan for completing the management task and includes a list of steps and associated resources of domain 105. Responsive to receiving the reply, computing device 101 generates a new prompt that identifies the plan. The new prompt may also identify a template that maps the relationships between the content and/or assets of domain 105.

Computing device 101 submits the new prompt to service 103 to elicit a response that indicates access requirements for extracting information related to the management task. Service 103 generates the response and transmits it to computing device 101. The response includes the access requirements. In the present embodiment the access requirements include an algorithm (e.g., an API, etc.) for accessing a database of domain 105.

Responsive to receiving the response, computing device 101 performs the management task by performing the steps listed in the plan. To perform the steps listed in the plan, computing device 101 employs the algorithm of the response to access the database of domain 105 and extract data from the database. Subsequent to extracting the data, computing device 101 performs the remaining steps listed in the plan. In the same or other embodiment, computing device 101 may display the output of the completed plan (e.g., a report, a visualization of data, etc.).

Figure 5:
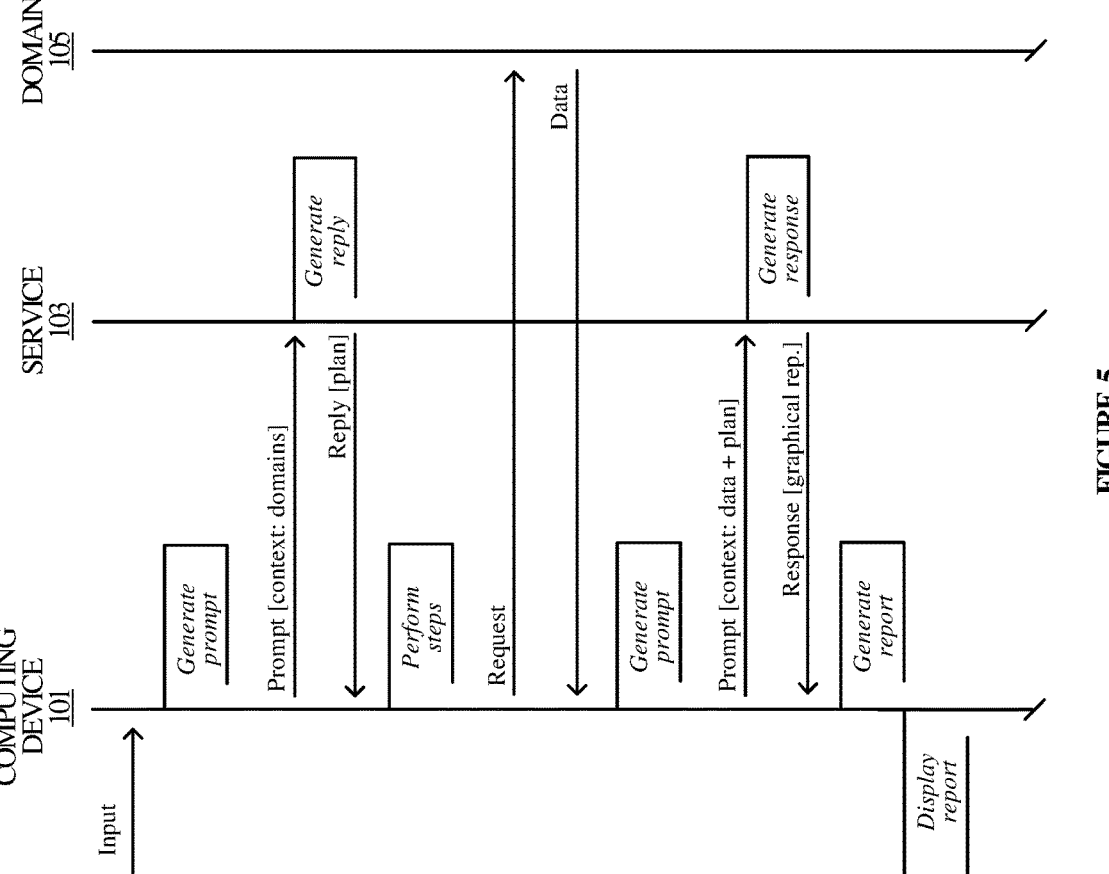
FIG. 5 illustrates an operational scenario in an implementation.
Figure 5:

FIG. 5 illustrates operational scenario 500 in an implementation and refers to elements of FIG. 1. In operational scenario 400, computing device 101 (e.g., via reporting process 200 of FIG. 2, via reporting process logic 305 of FIG. 3, etc.) receives a natural language input indicative of a management task to complete with respect to a wireless communications network. Computing device 101 identifies a context of the management task that will constrain service 103 to a domain of the wireless communications network (e.g., a network infrastructure domain, a network operations domain, a data services domain, a voice services domain, and a sales domain). For example, the context may constrain service 103 to a network infrastructure domain exclusive of the network operations domain, the data services domain, the voice services domain, and the sales domain; the context may constrain service 103 to a data services domain exclusive of network infrastructure domain, the network operations domain, the voice services domain, and the sales domain; etc.

Next, computing device 101 generates a prompt that identifies the management task and the context. In the present embodiment, the context includes a domain context for the wireless communications network. The domain context includes information about two or more domains of the wireless communications network. The domain context may also include a template of the domains that maps the relationships between content of the domains. Computing device 101 then submits the prompt to service 103 to elicit a reply indicating a plan for completing the management task that includes a list of steps and associated resources of the domain.

Service 103 generates a reply in response to the prompt and transmits the reply to computing device 101. The reply indicates the plan for completing the management task and includes a list of steps and associated resources of domain 105. Responsive to receiving the reply, computing device 101 performs the management task by performing the steps listed in the plan. To perform the steps listed in the plan, computing device 101 submits a request to an asset of domain 105 (e.g., a database, etc.) for data stored in association with the asset (e.g., weather report, sales report, equipment maintenance schedule, network traffic information, etc.). Subsequent to receiving the requested data, computing device 101 generates a new prompt that identifies the received data and the plan. The new prompt may also identify a template that maps a relationship between the received data and report format (e.g., format for a visual representation of operations data, format for a textual representation of asset data, format that combines visual and textual representations, etc.).

Computing device 101 submits the new prompt to service 103 to elicit a response that indicates a desired output related to the management task (e.g., graphical representation of the received data). Service 103 generates the response and transmits it to computing device 101. The response includes the graphical representation of the received data.

Computing device 101 performs the remaining steps listed in the plan, which includes generating a report that incorporates the graphical representation received with the response from service 103. Computing device 101 then displays the report in a user interface to an application (e.g., interface 133).

Figure 6:
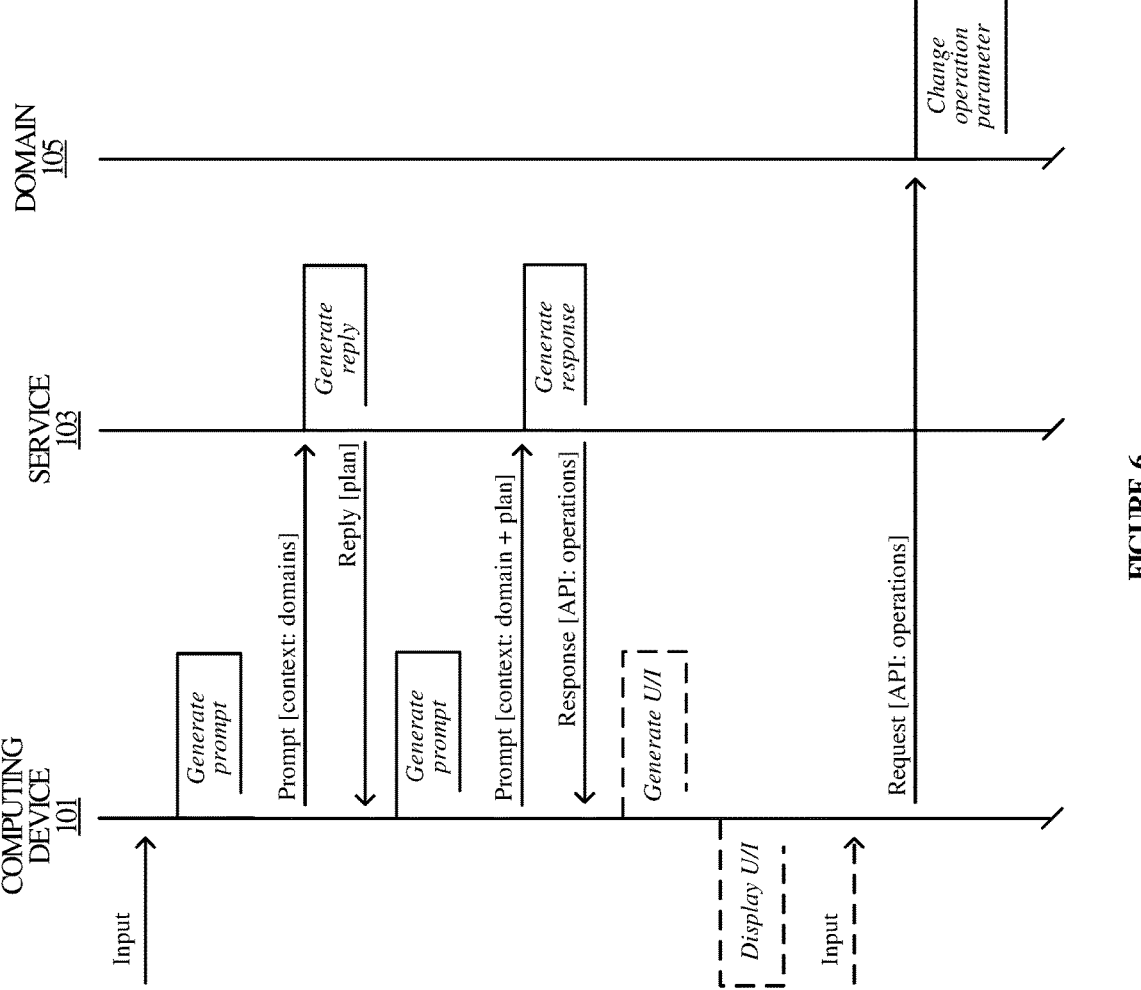
FIG. 6 illustrates an operational scenario in an implementation.

FIG. 6 illustrates operational scenario 600 in an implementation and refers to elements of FIG. 1. In operational scenario 600, computing device 101 (e.g., via reporting process 200 of FIG. 2, via reporting process logic 305 of FIG. 3, etc.) receives a natural language input indicative of a management task to complete with respect to a wireless communications network. Computing device 101 identifies a context of the management task that will constrain service 103 to a domain of the wireless communications network (e.g., a network infrastructure domain, a network operations domain, a data services domain, a voice services domain, and a sales domain). For example, the context may constrain service 103 to a network infrastructure domain exclusive of the network operations domain, the data services domain, the voice services domain, and the sales domain; the context may constrain service 103 to a data services domain exclusive of network infrastructure domain, the network operations domain, the voice services domain, and the sales domain; etc.

Next, computing device 101 generates a prompt that identifies the management task and the context. In the present embodiment, the context includes a domain context for the wireless communications network. The domain context includes information about two or more domains of the wireless communications network. The domain context may also include a template of the domains that maps the relationships between content of the domains. Computing device 101 then submits the prompt to service 103 to elicit a reply indicating a plan for completing the management task that includes a list of steps and associated resources of the domain.

Service 103 generates a reply in response to the prompt and transmits the reply to computing device 101. The reply indicates the plan for completing the management task and includes a list of steps and associated resources of domain 105. Responsive to receiving the reply, computing device 101 generates a new prompt that identifies the plan. The new prompt may also identify a template that maps the relationships between the content and/or assets of domain 105.

Computing device 101 submits the new prompt to service 103 to elicit a response that indicates an algorithm (e.g., API) for controlling an operating parameter of an asset of domain 105. Service 103 generates the response and transmits it to computing device 101. The response includes the algorithm for controlling the operation of the asset.

Responsive to receiving the response, computing device 101 performs the management task by performing the steps listed in the plan. To perform the steps listed in the plan, computing device 101 employs the algorithm of the response to change the operation parameter of the asset of domain 105.

In the same or other embodiment, computing device 101 may generate a user interface that includes a description of the change to the operation parameter and an inquiry requesting a user of computing device 101 to confirm or reject the change to the operation parameter. Computing device 101 may surface the user interface through which the user may submit a response.

In the present embodiment, computing device 101 surfaces the user interface prior to employing the algorithm of the response, and the user (not shown) provides an input confirming the change to the operation parameter. Responsive to the input, computing device 101 transmits a request to domain 105 that includes the algorithm for changing the operating parameter. Responsive to receiving the request, the operation parameter of the asset of domain 105 is changed.

Figure 7:
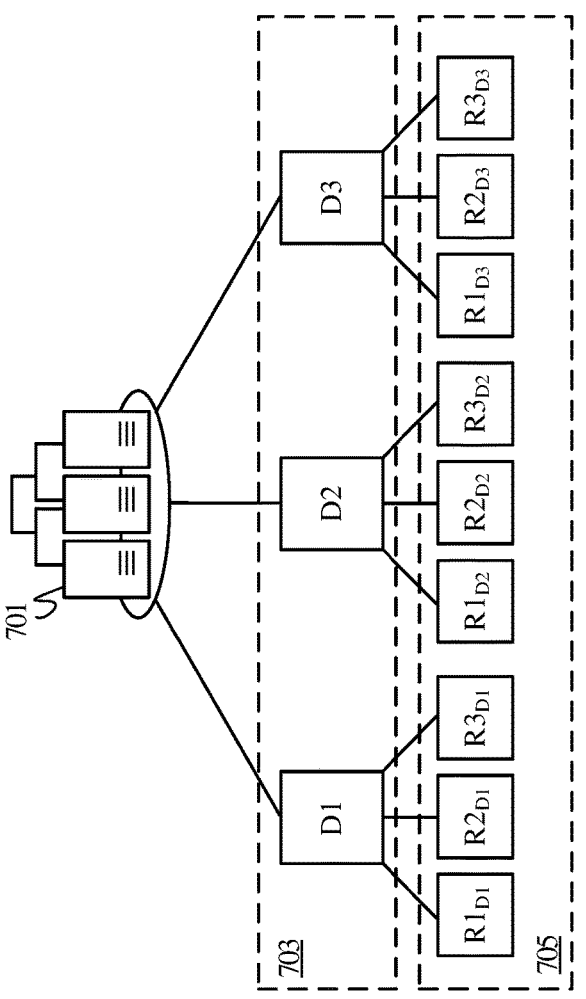
FIG. 7 illustrates a conceptual schematic environment in accordance with an implementation.

FIG. 7 illustrates a conceptual schematic environment 700 in an implementation. Environment 700 includes network 701, which is representative of a wireless communications network that provides wireless data and voice services to wireless communication devices like phones, computers, televisions, gateways, wearables, Internet of things, and the like. The wireless data services may include internet-access, messaging, conferencing, or some other functionality. Network 701 employs one or more server computers co-located or distributed across one or more data centers. Examples of such servers include web servers, application servers, virtual or physical (bare metal) servers, or any combination or variation thereof, of which computing device 801 in FIG. 8 is broadly representative.

Network 701 includes domains 703 (e.g., D1, D2, and D3), of which domain 105 of FIG. 1 and domain 303 of FIG. 3 are representative. Domains 703 are each representative of a domain hosted by network 701. Example domains include a sales domain, a network infrastructure domain, a network operations domain, data services domain, voice services domain, and the like. Domains 703 are associated with features specific to each respective domain. For example, D1 may be associated with domain-specific features of a sales domain, which include data and assets associated with the tasks, activities, and content related to the sale of consumer goods and services, such as sales reports, marketplace information, platform information, supply chain information, etc. In the same or other embodiment, D2 may be associated with domain-specific features of a network infrastructure domain, which includes data and assets associated with the tasks, activities, and content related to the infrastructure of a wireless communications network, such as maintenance policies and procedures, system monitoring and performance data, helpdesk inquiries and resolutions, systems configuration, etc. In the same or other embodiment, D3 may be associated domain-specific features of a network operations domain, which includes data and assets associated with the tasks, activities, and content related to the operations of a wireless communications network, such as legal policies and procedures, human resource policies and procedures, marketing policies and procedures, etc. Though only three domains are depicted, it is contemplated herein that network 701 may have any number of domains and sub-domains (not shown).

Network 701 also includes resources 705 (e.g., $R1_{D1}$– $R3_{D1}$, $R1_{D2}$–$R3_{D2}$, and –$R1_{D3}$–$R3_{D3}$). Resources 705 may be stored in a database or other datastore associated with a domain of domains 703, may be geospatially located in association with a domain of domains 703, or otherwise have a domain-specific feature that relates a resource of resources 705 to its respective domain. Resources 705 include operations documentation, such as sales data; maintenance logs; user data; legal and public policies; asset locations and management; operations manuals; weather reports; details on major events like national sporting events, hurricanes, etc.; and other details of network operation. Resources 705 also include wireless communications technology, such as antenna towers, transmission towers, switches, edge servers, gateway devices, etc.

FIG. 8 illustrates computing device 801 that is representative of any system or collection of systems in which the various processes, programs, services, and scenarios disclosed herein may be implemented. Examples of computing device 801 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 801 may be implemented as a single apparatus, system, or device or may be implemented in a distributed manner as multiple apparatuses, systems, or devices. Computing device 801 includes, but is not limited to, processing system 802, storage system 803, software 805, communication interface system 807, and user interface system 809 (optional). Processing system 802 is operatively coupled with storage system 803, communication interface system 807, and user interface system 809.

Processing system 802 loads and executes software 805 from storage system 803. Software 805 includes and implements reporting process 806, which is (are) representative of the reporting processes discussed with respect to the preceding Figures, such as reporting process 200. When executed by processing system 802, software 805 directs processing system 802 to operate as described herein for at least the various processes, operational scenarios, and sequences discussed in the foregoing implementations. Computing device 801 may optionally include additional devices, features, or functionality not discussed for purposes of brevity.

Referring still to FIG. 8, processing system 802 may comprise a micro-processor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, graphical processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 (including reporting process 806) may be implemented in program instructions and among other functions may, when executed by processing system 802, direct processing system 802 to operate as described with respect to the various operational scenarios, sequences, and processes illustrated herein. For example, software 805 may include program instructions for implementing a reporting process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multithreaded, or in accordance with any other suitable execution paradigm, variation, or combination thereof. Software 805 may include additional processes, programs, or components, such as operating system software, virtualization software, or other application software. Software 805 may also comprise firmware or some other form of machine-readable processing instructions executable by processing system 802.

In general, software 805 may, when loaded into processing system 802 and executed, transform a suitable apparatus, system, or device (of which computing device 801 is representative) overall from a general-purpose computing system into a special-purpose computing system customized to support an application service in an optimized manner. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method for managing wireless network operations, the method comprising:

receiving natural language input indicative of a management task to complete with respect to a wireless communications network;

utilizing a natural langue processing model to tokenize the natural language input to generate tokens, analyze the tokens to identify a named entity, identify a grammatical relation between words of the natural langue input, and identify a context of the management task based on the named entity and the grammatical relation that will constrain a large language model (LLM) to a domain of the wireless communications network;

generating a prompt that identifies the management task and the context;

submitting the prompt to the LLM to elicit a reply indicating a plan for completing the management task that includes a list of steps and associated resources of the domain;

receiving the reply from the LLM, including the plan;

generating, based on the reply, a second prompt that identifies the plan and a template of the domain;

submitting the second prompt to the LLM to elicit a second reply that indicates access requirements for extracting, from a database of the domain, information related to the management task;

receiving the second reply from the LLM, wherein the second reply includes the access requirements; and in response, automatically performing the management task based on the plan.

2. The method of claim 1, wherein the context constrains the LLM to the domain, exclusive of multiple other domains, wherein the domain comprises one of a network infrastructure domain, a network operations domain, a data services domain, a voice services domain, and a sales domain, and wherein the multiple other domains include remaining ones of the network infrastructure domain, the network operations domain, the data services domain, the voice services domain, and the sales domain.

3. The method of claim 2, wherein the management task comprises a report associated with the domain, and wherein performing the management task comprises:

accessing a database associated with the domain;

extracting from the database, information related to the management task; and generating a report based on the information.

4. The method of claim 3, wherein the report comprises a graphical representation of the information.

5. The method of claim 1, wherein the wireless communications network comprises multiple domains, wherein the multiple domains are each associated with respective domain-specific features, and wherein the context comprises the domain-specific features of the multiple domains.

6. The method of claim 1 wherein automatically performing the management task based on the plan comprises automatically performing the management task based on the plan and the access requirements in response to receiving the reply and the second reply from the LLM.

7. The method of claim 1, wherein the access requirements comprise an algorithm, and wherein performing the management task comprises accessing the database of the domain using the algorithm.

8. The method of claim 1, wherein performing the management task based on the plan comprises generating at least one of a graph, a chart, a word document, a slide presentation, and an animation.

9. The method of claim 1, wherein performing the management task based on the plan comprises changing an operating parameter of an asset of the wireless communications network.

10. A computing apparatus comprising:

one or more computer-readable storage media;

one or more processors operatively coupled with the one or more computer-readable storage media; and program instructions stored on the one or more computer-readable storage media that, when executed by the one or more processors, direct the computing apparatus to at least:

receive natural language input indicative of a management task to complete with respect to a wireless communications network;

utilize a natural langue processing model to tokenize the natural language input to generate tokens, analyze the tokens to identify a named entity, identify a grammatical relation between words of the natural langue input, and identify a context of the management task based on the named entity and the grammatical relation that will constrain a large language model (LLM) to a domain of the wireless communications network;

generate a prompt that identifies the management task and the context;

submit the prompt to the LLM to elicit a reply indicating a plan for completing the management task that includes a list of steps and associated resources of the domain;

receive the reply from the LLM, including the plan;

generate, based on the reply, a second prompt that identifies the plan and a template of the domain;

submit the second prompt to the LLM to elicit a second reply that indicates access requirements for extracting, from a database of the domain, information related to the management task;

receive the second reply from the LLM, wherein the second reply includes the access requirements; and in response, automatically perform the management task based on the plan.

11. The computing apparatus of claim 10, wherein the context constrains the LLM to the domain, exclusive of multiple other domains, wherein the domain comprises one of a network infrastructure domain, a network operations domain, a data services domain, a voice services domain, and a sales domain, and wherein the multiple other domains include remaining ones of the network infrastructure domain, the network operations domain, the data services domain, the voice services domain, and the sales domain.

12. The computing apparatus of claim 11, wherein the management task comprises a report associated with the domain, and wherein to perform the task the program instructions direct the computing apparatus to:

access a database associated with the domain;

extract from the database, information related to the management task; and generate a report based on the information.

13. The computing apparatus of claim 12, wherein the report comprises a graphical representation of the information.

14. The computing apparatus of claim 10, wherein the program instructions further direct the computing apparatus to automatically perform the management task based on the plan and the access requirements in response to receiving the reply and the second reply.

15. The computing apparatus of claim 10, wherein to perform the management task based on the plan, the program instructions direct the computing apparatus to generate at least one of a graph, a chart, a word document, a slide presentation, and an animation.

16. One or more computer-readable storage media having program instructions stored thereon that, when executed by one or more processors operatively coupled with the one or more computer-readable storage media, direct a computing device to:

receive natural language input indicative of a management task to complete with respect to a wireless communications network;

utilize a natural langue processing model to tokenize the natural language input to generate tokens, analyze the tokens to identify a named entity, identify a grammatical relation between words of the natural langue input, and identify a context of the management task based on the named entity and the grammatical relation that will constrain a large language model (LLM) to a domain of the wireless communications network;

generate a prompt that identifies the management task and the context;

submit the prompt to the LLM to elicit a reply indicating a plan for completing the management task that includes a list of steps and associated resources of the domain;

receive the reply from the LLM, including the plan;

generate, based on the reply, a second prompt that identifies the plan and a template of the domain;

submit the second prompt to the LLM to elicit a second reply that indicates access requirements for extracting, from a database of the domain, information related to the management task;

receive the second reply from the LLM, wherein the second reply includes the access requirements; and in response, automatically perform the management task based on the plan.

17. The one or more computer-readable storage media of claim 16, wherein the context constrains the LLM to the domain, exclusive of multiple other domains, wherein the domain comprises one of a network infrastructure domain, a network operations domain, a data services domain, a voice services domain, and a sales domain, and wherein the multiple other domains include remaining ones of the network infrastructure domain, the network operations domain, the data services domain, the voice services domain, and the sales domain.

18. The one or more computer-readable storage media of claim 17, wherein the management task comprises a report associated with the domain, and wherein to perform the task the program instructions direct the computing device to:

access a database associated with the domain;

extract from the database, information related to the management task; and generate a report based on the information.

19. The one or more computer-readable storage media of claim 18, wherein the report comprises a graphical representation of the information.

20. The one or more computer-readable storage media of claim 19, wherein the program instructions further direct the computing device to automatically perform the management task based on the plan and the access requirements in response to receiving the reply and the second reply.

* * * * *